E. W. MOCH.
MACHINE FOR SPLITTING PLUME STEMS.
APPLICATION FILED OCT. 31, 1911.
1,032,417.
Patented July 16, 1912.
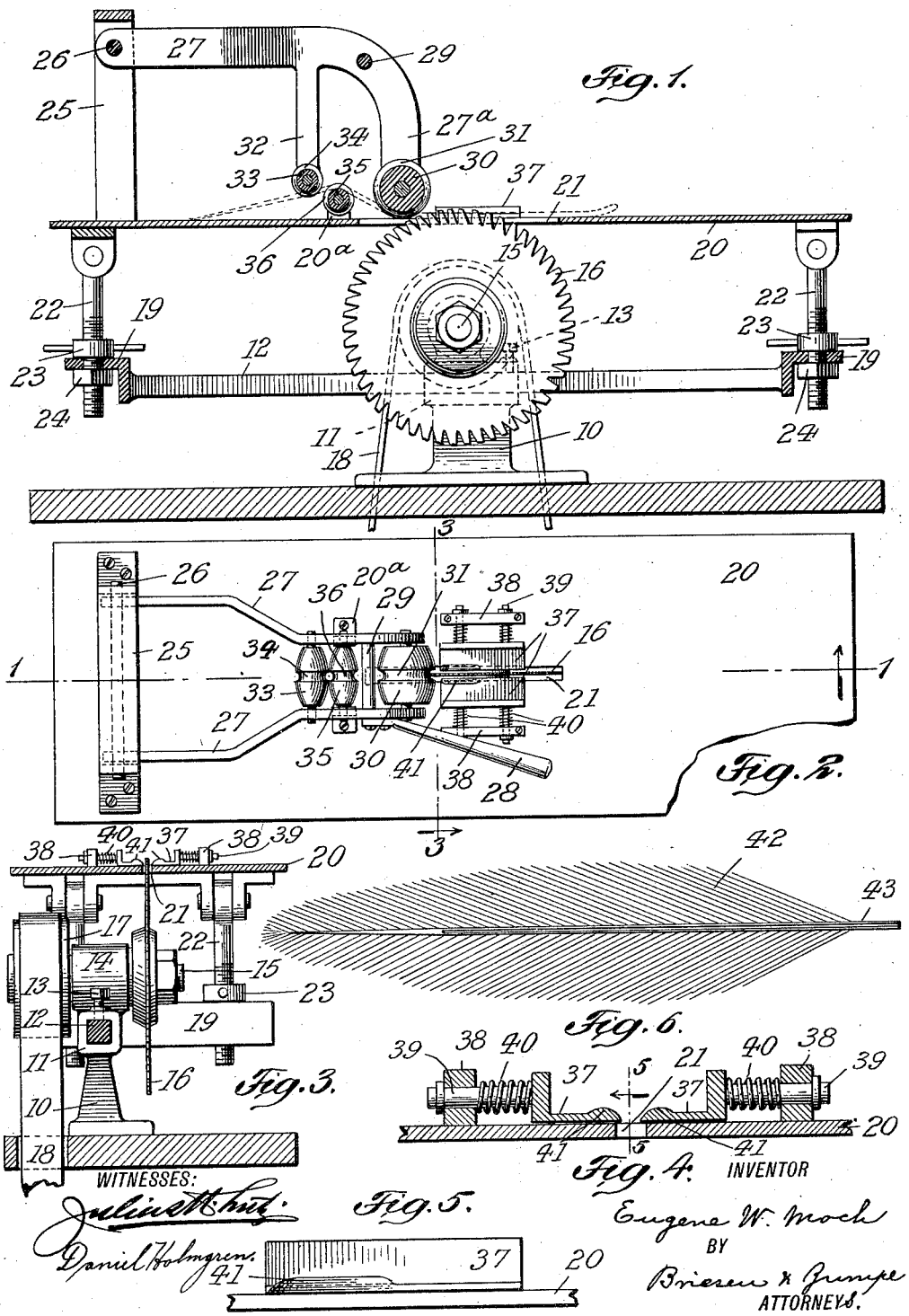

UNITED STATES PATENT OFFICE.

EUGENE W. MOCH, OF NEW YORK, N. Y.

MACHINE FOR SPLITTING PLUME-STEMS.

1,032,417.  Specification of Letters Patent.  Patented July 16, 1912.

Application filed October 31, 1911. Serial No. 657,841.

*To all whom it may concern:*

Be it known that I, EUGENE W. MOCH, a citizen of the United States, residing at New York city, county and State of New York, have invented a new and Improved Machine for Splitting Plume-Stems, of which the following is a specification.

This invention relates to a machine of novel construction for splitting the stems of plumes for the purpose of reducing their thickness and increasing their pliability. In this way the appearance of the plumes is enhanced and they are more particularly adapted to be worked into trimmings, boas and similar articles.

In the accompanying drawing: Figure 1 is a longitudinal section of a machine embodying my invention on line 1—1, Fig. 2; Fig. 2 a plan; Fig. 3 a cross section on line 3—3, Fig. 2; Fig. 4 a cross section through the guard; Fig. 5 a longitudinal section on line 5—5, Fig. 4, and Fig. 6 a face view of a plume split by the machine.

A standard 10 is provided with an upper squared eye 11 that receives a bar 12, which is longitudinally adjustable upon the standard and is clamped in position by screw 13. Integral with standard 10, is the bearing 14, for the shaft 15 of a circular saw 16, driven from pulley 17 by belt 18. Bar 12 is provided at each end with a laterally extending arm 19 made of angle iron, and supporting a work table or plate 20 slotted as at 21, for the passage of saw 16. Means are provided for vertically adjusting table 20, so that the length of the projecting effective saw blade segment may be regulated. For this purpose there are pivoted to the ends of table 20, threaded rods 22 carrying nuts 23 that are supported on arms 19, so that on turning the nuts, the table may be readily raised or lowered. Jam nuts 24 carried by rods 22 below arms 19 fix the table in position after it has been set.

From one end of table 20, there extends upwardly a bearing 25 to which are pivoted at 26, the two arms 27 of an oscillatory frame, operable by a handle 28, the two arms 27 being connected by a tie rod 29. The forward ends 27ª of arms 27 are deflected downward and constitute the bearings for a first guide roller 30. This roller tapers off uniformly toward both ends to accommodate the flues of the plume and is provided with a central circumferential groove 31 of a width sufficient to accommodate the plume stem. Back of their depending ends 27ª, there extend downwardly from arms 27, a pair of bearings 32, in which is journaled a second guide roller 33, made somewhat smaller than roller 30, but of the same general configuration, its circumferential groove being shown at 34. The correlation of the parts is such that roller 33 is raised to a greater height above table 20, than roller 30 and that the latter is arranged above slot 21 slightly back of saw 16. By adjusting the table in a horizontal direction, through its regulable connection with standard 10, the distance between roller 30 and saw 16 may be varied, so that the device may be set to stems of varying thicknesses.

From table 20 there project upwardly a pair of bearings 20ª in which is journaled a third guide roller 35 interposed between rollers 30, 33 and made of the same general shape as the same, its circumferential groove being shown at 36. The elevation of roller 35 above table 20 is such that the stem of the plume is bent into a sinuous shape between the rollers, so that a tight gripping action is insured.

Flanking slot 21 there are provided a pair of guards 37 connected to fixed rails 38 of table 20 by pins 39 carrying springs 40, so that in this way the guards are laterally yieldable to accommodate thicker and thinner plume stems. Each guard is of angular form in cross section and is provided along the saw 16 with bulged edges or beads 41 that are designed to protect the operator's hand and at the same time indicate at what point the plume stem is to be grasped.

In use arms 27 are swung up, the plume 42 to be split is placed upon the table so that its stem 43 engages roller 35 and then the arms are again swung down, so that rollers 30 and 33 will likewise engage stem 43. The latter which had been grasped by the operator directly in front of beads 41, is drawn along the rotating saw, so that it is split in a quick and accurate manner. The tip of the stem which was held by the operator's hand and had remained unsplit is finally cut off and the pith is removed if desired.

I claim:

1. A machine of the character described, comprising a slotted table, a circular saw projecting partly therethrough, an oscillative frame above the table, a pair of guide rollers journaled in said frame, and a third guide roller journaled to the table intermediate the first named guide rollers.

2. A machine of the character described, comprising a slotted table, a circular saw projecting partly therethrough, and a plurality of guide rollers journaled above the table and provided with circumferential grooves and with uniformly tapering sections at both sides of said grooves.

3. A machine of the character described, comprising a slotted table, a circular saw projecting partly therethrough, an oscillative frame pivoted to the table, a pair of tapering and grooved guide rollers journaled in said frame, and an additional tapering and grooved guide roller journaled to the table intermediate the first named guide rollers.

4. A machine of the character described, comprising a slotted table, a circular saw projecting partly therethrough, a plurality of guide rollers mounted at one end of the table slot, and a pair of laterally yieldable guards flanking said slot.

5. A machine of the character described, comprising a slotted table, a circular saw projecting partly therethrough, a plurality of guide rollers mounted at one end of the table slot, and a pair of laterally yieldable guards flanking said slot, said guards being provided with beaded edges along said slot.

6. A machine of the character described, comprising a circular saw, a slotted table adapted to accommodate the same, means for vertically adjusting the table, additional means for horizontally adjusting the table, a frame pivoted to the table and a grooved guide roller journaled to the frame.

7. A machine of the character described, comprising a circular saw, a slotted table adapted to accommodate the same, means for vertically adjusting the table, additional means for horizontally adjusting the table, a frame pivoted to the table, a pair of grooved guide rollers journaled to the frame, an additional grooved guide roller journaled to the table intermediate the first named guide rollers, and a guard yieldingly mounted on the table.

EUGENE W. MOCH.

Witnesses:
 FRANK V. BRIESEN,
 KATHERYNE KOCH.

Copies of this patent may be obtained for five cents each, by addressing the "Commissioner of Patents, Washington, D. C."